Feb. 9, 1960
P. NARBUT
2,924,635
ELECTRICAL APPARATUS
Original Filed Aug. 16, 1952
2 Sheets-Sheet 1
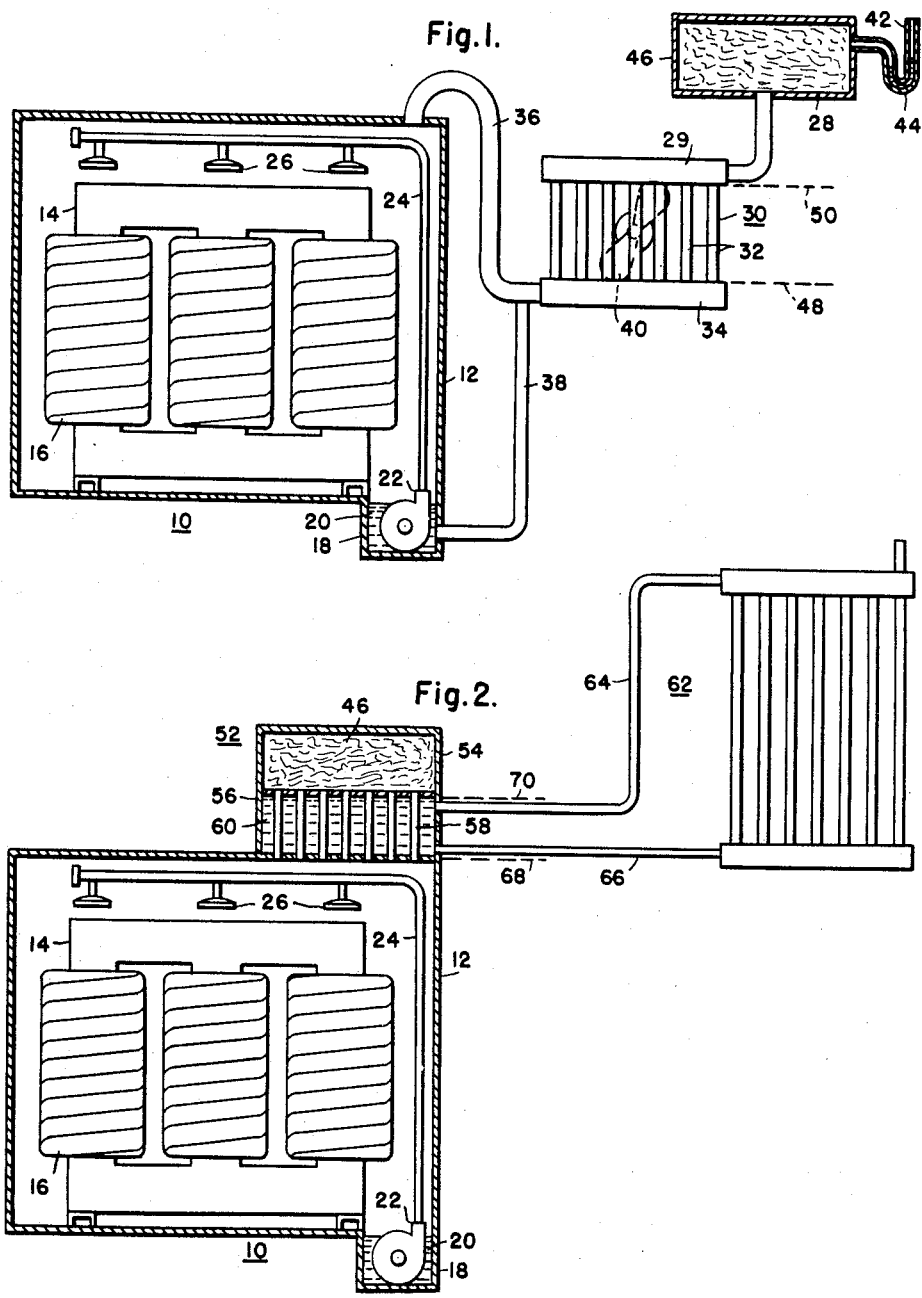
INVENTOR
Paul Narbut
BY
*F. E. Browder*
ATTORNEY

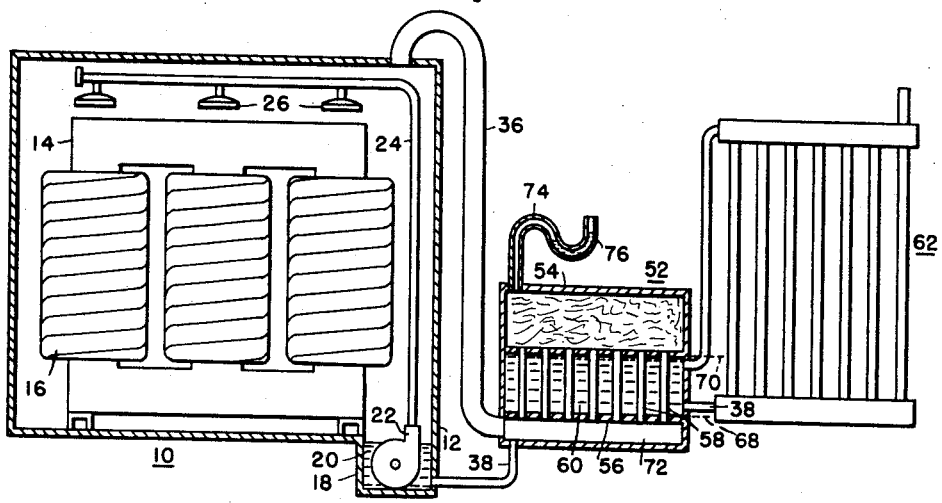
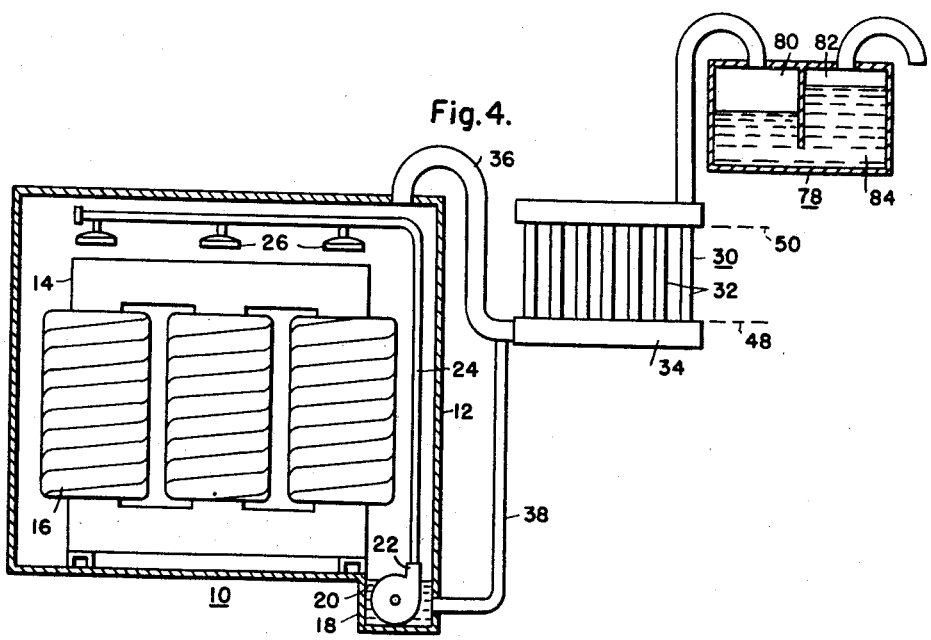

United States Patent Office 2,924,635
Patented Feb. 9, 1960

2,924,635
ELECTRICAL APPARATUS

Paul Narbut, Sharpsville, Pa., assignor to Westinghouse Electric Corporation, East Pittsburgh, Pa., a corporation of Pennsylvania Original application August 16, 1952, Serial No. 304,730, now Patent No. 2,858,355, dated October 28, 1958. Divided and this application March 6, 1958, Serial No. 719,536

5 Claims. (Cl. 174—15)

This invention relates to electrical apparatus and particularly to apparatus utilizing a fluid dielectric atmosphere for insulation and a cooling mechanism for dissipating heat developed during operation of the apparatus.

This application is a division of application Serial No. 304,730, filed August 16, 1952 by Paul Narbutovskih, now by change of name Paul Narbut, and assigned to the same assignee as this invention.

In the Hill Patent 2,561,738, filed November 6, 1948, and assigned to the same assignee as this application, there is disclosed enclosed electrical apparatus utilizing a relatively small amount of fluorinated organic liquid coolant which is sprayed over the electrical windings to cool them by evaporation of the liquid coolant, the evolved vapors constituting a part of an applied electrically insulating gas atmosphere. Such apparatus is efficient in operation but has the disadvantage that the vapor pressure developed within the casing varies greatly sometimes becoming so great as to effect damage to the casing and to cause leaks at the joints of the casing. On the other hand, if the vapor pressure should decrease below a predetermined pressure, then a detrimental decrease in the dielectric strength of the insulating vapors is encountered.

An object of this invention is to provide, in an enclosed electrical apparatus depending on fire and explosion-proof gases for its insulation and relying upon vaporization of a liquid coolant to dissipate heat developed from the gases to automatically maintain the pressure and temperature within the casing within predetermined values.

Another object of this invention is to provide an enclosed electrical apparatus with a vaporizable liquid coolant which is applied to the electrical apparatus for dissipating heat therefrom and to control the cooling of the vaporized coolant by utilizing the pressure thereof to compress and displace a relatively light weight non-condensable gas contained in an auxiliary casing connected to the enclosed apparatus to expose the vaporized coolant to the effect of a cooling apparatus, the cooling effect of such cooling apparatus on the vaporized coolant increasing as the vaporized coolant displaced the non-condensable gases.

Other objects of this invention will become apparent from the following description when taken in conjunction with the accompanying drawings, in which:

Figure 1 is a diagrammatic view of a transformer constructed in accordance with this invention.

Fig. 2 is a diagrammatic view of a transformer illustrating another embodiment of this invention.

Fig. 3 is a diagrammatic view of a transformer showing a slightly different arrangement of the components of the transformer of Fig. 2, and Fig. 4 is a diagrammatic view of a transformer illustrating a further embodiment of this invention.

Referring to Fig. 1, this invention is illustrated by reference to a transformer 10 comprising a sealed casing 12 within which is disposed a magnetic core 14 and electrical windings 16 associated therewith disposed to seat on the base of the case. For the purpose of simplifying the drawings, the leads to the windings 16 and the bushings normally carried by the top or cover of the casing 12 are not shown.

As illustrated, the bottom of the casing 12 is provided with a sump 18 in which there is disposed a supply 20 of vaporizable liquid coolant. The supply 20 of liquid coolant is relatively small as compared to the size of the casing 12 being normally open in the sump 18 out of contact with the core 14 and electrical windings 16.

Different vaporizable liquid coolants are known to those skilled in the art and can be employed in practicing this invention. The vaporizable liquid coolant may comprise the liquid fluorinated organic compounds selected from the group consisting of hydrocarbons, hydrocarbon ethers and tertiary hydrocarbon amines in which at least half the hydrogen atoms have been substituted by at least one halogen selected from the group consisting of chlorine and fluorine, and of which at least half of the halogens is fluorine. The hydrocarbons and the hydrocarbon groups attached to oxygen or nitrogen atoms may be aliphatic, aromatic, cycloaliphatic and alkaryl. Liquid perfluorocarbons, perfluorocarbon ethers and perfluorocarbon tertiary amines boiling between 50° C. and 225° C. have outstanding properties. Perhalocarbon compounds composed of only carbon and a halogen selected from at least one of the group consisting of chlorine and fluorine, of which fluorine comprises at least half the halogen atoms, have proven to be highly useful.

The vapors of the fluorinated organic compound referred to hereinbefore have outstanding electrical insulating properties. They are superior to practically all other gases in such electrical insulating characteristics as breakdown strength, dielectric strength, power factor and resistance to formation of corona under similar conditions of pressure. These compounds are outstanding in their stability to chemical and thermal breakdown being surpassed only by the permanent gases. The fluorinated compounds in the liquid state exert negligible, if any, solvent or deteriorating action on ordinary insulating materials and varnishes employed in the preparation of conventional electrical elements such as windings, cores and coils.

As examples of specific fluorinated organic compounds having an effective dielectric strength and which may be utilized in practicing this invention either alone or in mixtures, reference may be had to the following list of fluorinated organic compounds:

| | Boiling point, ° C. |
|---|---|
| Perfluorophenanthrane | 205 |
| Perfluorodibutyl ether | 100 |
| Perfluorotriethyl amine | 71 |
| Perfluorotributyl amine | 178 |
| Prefluorodimethylcyclohexane | 101 |
| Perfluoromethylcyclohexane | 76 |
| Perfluoro-n-heptane | 82 |
| Perfluorotoluene | 102 |
| Perfluorocyclic ether ($C_8F_{16}O$) | 101 |
| Perfluorocyclic ether ($C_6F_{12}O$) | 52 |
| Monochlorotetrafluoro-(trifluoromethyl) benzene | 137 |
| Dichlorotrifluoro-(trifluoromethyl) benzene | 170 |
| Trichlorodifluoro-(trifluoromethyl) benzene | 207 |
| Monochloropentadecafluoroheptane | 96 |
| 2-chloro-1,4-bis(trifluoromethyl) benzene | 148 |
| 2-chlorotrifluoromethylbenzene | 150 |
| Perfluorodiethylcyclohexane | 148 |
| Perfluoroethylcyclohexane | 101 |
| Perfluoropropylcyclohexane | 123 |
| Chlorononafluorobis(trifluoromethyl) cyclohexane | 129 |
| Perfluoronaphthalane | 140 |
| Perfluoro-1-methylnaphthalane | 161 |

| | Boiling point, ° C. |
|---|---|
| Perfluorodimethylnaphthalanes | 177 to 179 |
| Perfluorindane | 116 to 117 |
| Perfluorofluorane | 190 |
| Perfluorobicyclo-(2.2.1) heptane | 70° (746 mm.) |

The amines, and ethers may have dissimilar halogen substituted hydrocarbon groups present as, for example, 2,2-dichloro - 1,1,1 - trifluoroethyl - perfluorobutylether and perfluorodibutylethylamine. The freezing points of the above listed liquid compounds are below zero degrees centigrade, many being below −50° C., so that they can be safely employed, individually or in mixture, under nearly all ambient conditions to be expected in service.

Perfluoromethylcyclohexane is one of the more suitable liquid coolants for the application described herein. Its physical properties are very suitable for this purpose and are listed below for illustrative purposes. Perfluoromethylcyclohexane has a boiling point of 76.3° C., a heat of vaporization of 22 calories per gram at the boiling point, a specific heat of 0.2 calorie per gram, a density of 1.8 and a freezing point below −50° C. It will, of course, be understood that mixtures of the perhalocarbons can be employed where each of the perhalocarbons has a boiling point within the range of 50° C. to 200° C.

In order to apply the liquid coolant 20 to the electrical windings 16, a pump 22 is disposed for operation to withdraw the liquid coolant 20 from the sump 18, the pump 22 being connected as by a conduit 24 to a spray device 26 from which the liquid coolant is distributed in the form of a fine spray (not shown) over the core 14 and windings 16. The liquid coolant when thus delivered distributes itself over the electrical elements and is caused to evaporate freely if the electrical components are hot, thereby cooling the core 14 and electrical windings 16.

In order to aid in dissipating the heat from the vapors evolved within the casing 12, an axialiary casing 28 is connected through its bottom to the upper header 29 of a cooling device 30 which is provided with a plurality of cooling tubes 32 forming passageways having cooling surfaces of substantial area, the purpose of which will be explained more fully hereinafter, the cooling device having its lower header 34 connected by conduit 36 to the upper end of the casing 12 and by conduit 38 to the sump 18. Where desired, a fan 40 may be disposed to be operated to blow over the tubes 32 to effect a forced cooling thereof. The auxiliary casing 28 is provided with a suitable breathing tube 42 such as one containing a liquid seal 44. Such a breather will automatically allow for adjustment of pressure to a predetermined value, and permit an escape of excessive amount of non-condensable gas, but will prevent any breathing under a full range of normal operating conditions.

In accordance with this invention, a supply of relatively inert, non-condensable gas 46, such as nitrogen, is contained in the cooling device 30 and the auxiliary casing 28. Since the non-condensable gas 46 is of light weight as compared to the vapors of the liquid coolant evolved within the casing 12, any nitrogen which might be contained within the casing 12 prior to heat being evolved from the electrical device therein will readily escape through the large conduit 36 to the cooling device 30.

In practice, sufficient nitrogen is introduced into the closed system so that for operation of the transformer under minimum load conditions, the nitrogen will just fill the auxiliary casing 28 and the cooling tubes 32 of the cooling device 30, the pressure of the vapors of the liquid coolant within the casing 12 under such operating conditions being just sufficient to maintain the nitrogen in the cooling tubes 32 at the level represented by the dotted line 48. Under such operating conditions, the surfaces of the casing 12 and the conduit 36 and lower header 34 is sufficient to effectively cool the vapors of the liquid coolant evolved within the casing 12 to dissipate sufficient heat therefrom to maintain a given pressure and temperature within the casing 12.

As the load on the transformer increases with an accompanying increase in temperature of the windings 16, the pressure of the vapors of liquid coolant evolved increases to effect a compression of the nitrogen in the cooling tubes 32 and auxiliary casing 28 with the result that the vapors of the liquid coolant displace the nitrogen and tend to fill the cooling tubes 32. The cooling device 30 is so designed that for all loads on the transformer ranging from the minimum to the maximum the boundary line between the vapors of the liquid coolant and the nitrogen gas will fall within the length of the cooling tubes 32, the dotted line 50 representing the boundary line between the vapors and the nitrogen gas under maximum load conditions for the transformer. Thus for maximum load conditions, the amount of heat loss which the system can dissipate will include the full capacity of the cooling tubes 32 and for intermediate loads the vapor-gas boundary line will automatically find its proper position so that the sum of the heat dissipated by the cooling tubes 32 plus the heat dissipated by the casing 12 and conduit 36 is always equal to the heat loss in the transformer.

It will, of course, be appreciated that the heat dissipated by the casing 12, conduit 36 and header 34 is a constant, whereas the heat dissipated by the cooling tubes 32 is a variable, the cooling effect of the latter on the vapors either with or without the forced air cooling of the fan 40, increasing as the vapors displace the nitrogen gas. Under such conditions, the increased cooling effect is sufficient to efficiently cool and condense the vapors of the liquid coolant at a rate to maintain a nearly constant pressure and temperature within the transformer casing 12.

The pressure, of course, will vary slightly, for as the vapor-gas boundary line moves from line 48 towards line 50 in the cooling tubes 32, there will be a change in the pressure in the auxiliary casing 28 as well as within the casing 12. This change in the pressure will depend upon the relative volume of the cooling tubes 32 and the volume within the gas-filled casing 28, but will be independent of the volume of the main casing 12. In practice, systems of the type described can be produced which will operate between the pressure limits of 15 to 17 pounds per square inch absolute pressure, that is, just slightly above atmospheric pressure. A cooling device 30 having an overall volume of 2 cubic feet is sufficient for effectively dissipating 10,000 watts therethrough, such cooling rate being sufficient to control the temperature of a 1000 kva. transformer.

In another embodiment of the invention, as illustrated in Fig. 2, an auxiliary casing 52 is positioned on the cover or top of the casing 12. The auxiliary casing 52 in this instance comprises an upper compartment 54 and a lower compartment 56, the upper compartment 54 being disposed to contain the supply of nitrogen gas 46. The lower compartment 56 of the auxiliary casing 52 is formed of a plurality of cooling tubes 58 which establish passageways having cooling surfaces of substantial area, the tubes 58 being disposed to connect the upper compartment 54 with the casing 12. The lower compartment 56 containing the cooling tubes 58 is sealed from the upper compartment 54 and from the casing 12 and is disposed to be supplied with a cooling medium 60 such as water or the like from the auxiliary radiator 62. Thus the upper and lower heads of the auxiliary radiator 62 are connected through conduits 64 and 66 to and in communication with the compartment 56 for effectively circulating a cooling medium thereto in contact with the cooling tubes 58. However, it is to be understood that instead of using the radiator 62 for supplying the cooling medium 60, any suitable source which would supply the cooling medium 60 to the lower compartment 56 can be used.

As in the previous embodiment, the auxiliary casing 52 is so designed that for minimum operating conditions of the transformer in the casing 12, the vapor pressure of the liquid coolant evolved within the casing 12 is sufficient to maintain the nitrogen gas in the compartment 54 and the cooling tubes 58 so that the vapor-gas boundary line is on a level represented by the dotted line 68. Under such operating conditions, the surfaces of the casing 12 is sufficient for dissipating the heat from the vapors of the liquid coolant within the casing 12 to maintain substantially constant pressure and temperature within the casing 12.

As the load on the transformer increases with the result that the temperature of the windings 16 increases, the vapor pressure of the liquid coolant tends to increase to compress the nitrogen gas in the cooling tube 58 whereby more and more of the vapors of the liquid coolant come in contact with the surfaces of the cooling tubes 58 to be condensed by the cooling effect of the cooling medium 60 in the lower compartment 56. Thus the vapor-gas boundary line will rise within the cooling tubes 58 until for maximum load conditions of the transformer, the vapor-gas boundary line reaches the top of the cooling tubes 58 along the line represented by the dotted line 70. Thus when the pressure within the casing 12 tends to increase, the cooling effect of the cooling medium 60 on such vapors is increased to dissipate heat therefrom and maintain a substantially constant pressure and temperature within the transformer casing 12.

In the embodiment of Fig. 2, it is essential that the cooling tubes 58 of the cooling device 52 be positioned at a level lower than the major portion of the radiator 62 in order to assure the flow of cooling water by convection. In the embodiment of Fig. 2, this necessitates the placing of the radiator 62 above the main transformer casing 12 with the result that disadvantages may occur in positioning the apparatus for an actual operation.

Fig. 3 illustrates an embodiment of the invention which overcomes the disadvantages of the positioning of the radiator 62 of the embodiment of Fig. 2. In Fig. 3, the auxiliary casing 52 is positioned adjacent the bottom of the casing 12 with the radiator 62 disposed substantially on the same level as the casing 12. In this instance, the auxiliary casing 52 is provided with a lower header 72 in communication with the cooling tubes 58, the lower header 72 being connected to the top of the casing 12 by means of an enlarged conduit 36 in a manner similar to that utilized in the embodiment of Fig. 1. The header 72 is also connected to the sump 18 by means of a smaller conduit 38 which will permit return of the condensed liquid coolant from the auxiliary casing 52 to the sump 18 for recirculation within the casing 12. The operation of the auxiliary casing 52 for dissipating the heat from the vapors of the liquid coolant is the same in this case as in the embodiment of Fig. 2, the dotted line 68 representing the gas-vapor boundary line for minimum load operating conditions of the transformer and the dotted line 70 representing the vapor-gas boundary line under maximum load conditions for the transformer. Where desired, the auxiliary casing 52 may also be provided with a breather tube 74 illustrated and having a liquid trap 76 therein for functioning in the well-known manner of breathers. As in the previous embodiment, the liquid cooling medium 60 circulating in the compartment 56 and the radiator 62 efficiently circulates by convection to dissipate the heat from the vapors of the liquid coolant, the cooling effect of the cooling medium increasing as the vapors displace the nitrogen gas from the cooling tubes 58.

In another embodiment of this invention illustrated in Fig. 4, a double expansion tank 78 is utilized instead of the auxiliary casing 28 of the embodiment of Fig. 1. In this instance, the double expansion tank 78 comprises two compartments 80 and 82 open only at their bottom in communication with each other and containing a liquid medium 84, such as oil or the like, disposed to be displaced from one compartment to the other as the pressure within the casing 12 forces the nitrogen gas from the cooling device 30 into the compartment 80, the compartment 82 being open to the atmosphere. Thus the volume of the receiving chamber in the compartment 80 for receiving the nitrogen gas varies to accommodate the volume of gas displaced by the vapor from cooler 30. The volume of the double expansion tank 78 can be related to the volume of the cooling tubes 32 of the cooling device 30 so that the vapor-gas boundary line will vary between dotted lines 48 and 50 in accordance with the operating conditions of the transformer within the casing 12 from minimum load conditions to maximum load conditions, whereby the cooling effect of the cooling tubes 32 increase as the vapors of the liquid coolant displace the nitrogen gas forcing it into the compartment 80.

A fan (not shown) can be employed in conjunction with the cooling tubes 32 similar to that shown in Fig. 1 where it is desired to effect a forced cooling of the vapors in the cooling tubes 32.

This invention makes possible the provision of a totally enclosed system which will maintain substantially constant pressure and temperature within the casing 12. In practice, it is found that a variation of only one to two pounds per square inch pressure is necessary within the casing 12 for effectively dissipating the heat generated in the electrical device within the casing 12 from no load to full load, the cooling effect being definitely related to the pressure developed within the casing 12. By utilizing apparatus of the type described, the size of the transformer units will be reduced as compared to normally self-cooled transformers and oil will be completely excluded and replaced by inert non-combustible and non-explosive materials as compared to the oil-filled transformers.

While this invention has been described with particular reference to transformers, it will be understood that the invention may be applied to the other types of electrical apparatus such as, for example, switchgear, capacitors, generators, reactors and the like. The spraying of the liquid coolant on the electrical device may be accomplished in a number of different ways to effectively obtain substantially complete coverage of the electrical apparatus with the liquid coolant whereby the vapors of the liquid coolant may be efficiently evolved to efficiently extract or dissipate the heat from the electrical apparatus.

As is apparent, the apparatus described hereinbefore permits operation of a totally sealed system at a substantially constant pressure and temperature thus realizing all of the advantages of a low-pressure system and yet maintain the full dielectric strength of the vapor at that pressure for variable load conditions. An excellent heat transfer and cooling of the vapors under variable load conditions is obtained with a minimum of apparatus.

I claim as my invention:

1. In electrical apparatus, the combination comprising, an enclosed casing, a source of heat disposed in the enclosed casing, means for dissipating the heat from said source comprising a supply of vaporizable fluorinated organic liquid coolant boiling between 50° C. and 225° C. and means for applying a layer of the fluorinated organic liquid coolant over said source of heat to cool it by evaporation of the fluorinated organic liquid coolant to a condensable vapor, the vapor of the fluorinated organic liquid coolant having an effective dielectric strength, an auxiliary casing, passageways having cooling surfaces of substantial area connected in communication between the enclosed casing and the auxiliary casing, a non-condensable gas disposed in the auxiliary casing and said passageways to provide a compressible cushion for the condensable vapors from the enclosed casing to thereby permit the condensable vapors to enter said passageways as the pressure of the vapors within the casing increases above a predetermined value, the non-condensable gas, the auxiliary casing and said passageways cooperating with the flow of condensable vapors to provide for exposing only sufficient cooling surface to control the rate of condensation of the condensable vapors to maintain in the enclosed casing a sufficiently high vapor pressure of the condensable vapors to effect an adequate dielectric strength of the condensable vapors, and a cooling liquid medium disposed about said passageways in contact therewith to dissipate heat from the condensable vapors as they enter said passageways, the cooling effect of the liquid medium on the condensable vapors increasing as the condensable vapors compress the non-condensable gas and fill said passageways.

2. In electrical apparatus, the combination comprising, an enclosed casing, a source of heat disposed in the enclosed casing, means for dissipating the heat from said source comprising a supply of vaporizable fluorinated organic liquid coolant boiling between 50° C. and 225° C. and means for applying a layer of the fluorinated organic liquid coolant over said source of heat to cool it by evaporation of the fluorinated organic liquid coolant to a condensable vapor, the vapor of the fluorinated organic liquid coolant having an effective dielectric strength, an auxiliary casing, passageways having cooling surfaces of substantial area connected in communication between the enclosed casing and the auxiliary casing, a non-condensable gas disposed in the auxiliary casing and said passageways to provide a compressible cushion for the condensable vapors from the enclosed casing to thereby permit the condensable vapors to enter said passageways as the pressure of the vapors within the casing increases above a predetermined value, the non-condensable gas, the auxiliary casing and said passageways cooperating with the flow of condensable vapors to provide for exposing only sufficient cooling surface to control the rate of condensation of the condensable vapors to maintain in the enclosed casing a sufficiently high vapor pressure of the condensable vapors to effect an adequate dielectric strength of the condensable vapors, and means for circulating by convection a liquid cooling medium about said passageways in contact therewith to dissipate heat from the condensable vapors as they enter said passageways, the cooling effect of the liquid medium on the condensable vapors increasing as the condensable vapors compress the non-condensable gas and fill said passageways.

3. In electrical apparatus, the combination comprising, an enclosed casing, a source of heat disposed in the enclosed casing, means for dissipating the heat from said source comprising a supply of vaporizable fluorinated organic liquid cooling boiling between 50° C. and 225° C. and means for applying a layer of the fluorinated organic liquid coolant over said source of heat to cool it by evaporation of the fluorinated organic liquid coolant to a condensable vapor, the vapor of the fluorinated organic liquid coolant having an effective dielectric strength, an auxiliary casing having two chambers in communication with each other at the bottom only thereof, one of the chambers being open to the atmosphere, a liquid medium in the auxiliary casing disposed for movement between the two chambers, passageways having cooling surfaces of substantial area connected in communication between the enclosed casing and the other one of the two chambers, a non-condensable gas disposed in said other one of the two chambers above the liquid medium therein and in said passageways to provide a compressible cushion for the condensable vapors from the enclosed casing, the liquid medium in the auxiliary casing being movable from said other one of the chambers to said one of the chambers as the pressure of the condensable vapors within the enclosed casing increases above a predetermined value to thereby accommodate the non-condensable gas and permit the condensable vapors to enter said passageways, the cooling effect of the cooling surfaces of said passageways on the condensable vapors increasing as the condensable vapors fill said passageways and, the non-condensable gas, the auxiliary casing and said passageways cooperating with the flow of condensable vapors to provide for exposing only sufficient cooling surface to control the rate of condensation of the condensable vapors to maintain in the enclosed casing a sufficiently high vapor pressure of the condensable vapors to effect an adequate dielectric strength of the condensable vapors.

4. In a sealed electrical apparatus, the combination comprising, a sealed casing, a source of heat disposed in the casing, means for dissipating the heat from said source comprising a supply of vaporizable perhalocarbon liquid coolant and means for applying a thin layer of the liquid coolant over said source of heat to cool it by evaporation of the coolant to a condensable vapor, an auxiliary casing, passageways having cooling surfaces of substantial area connected in communication between the sealed casing and the auxiliary casing, a non-condensable gas disposed in the auxiliary casing and said passageways to provide a compressible cushion for the condensable vapors from the sealed casing to thereby permit the condensable vapors to enter said passageways as the pressure of the vapors within the sealed casing increases above a predetermined value, the non-condensable gas, the auxiliary casing and said passageways cooperating with the flow of condensable vapor to provide for exposing only sufficient cooling surface to control the rate of condensation of the condensable vapors to maintain in the sealed casing a sufficiently high vapor pressure of the condensable vapors to effect an adequate dielectric strength of the condensable vapors, and a cooling liquid medium disposed about said passageways in contact therewith to dissipate heat from the condensable vapors as they enter said passageways, the cooling effect of the liquid medium on the condensable vapors increasing as the condensable vapors compress the non-condensable gas and fill said passageways.

5. In a sealed electrical apparatus, the combination comprising, a sealed casing, a source of heat disposed in the casing, means for dissipating the heat from said source comprising a supply of liquid perhalocarbon boiling at a temperature between 50° C. and 165° C. at atmospheric pressure and means for applying a thin layer of the liquid perhalocarbon over said source of heat to cool it by evaporation of the perhalocarbon to a condensable vapor, an auxiliary casing having two chambers in communication with each other at the bottom only thereof, one of the chambers being open to the atmosphere, a liquid medium in the auxiliary casing disposed for movement between the two chambers, passageways having cooling surfaces of substantial area connected in communication between the sealed casing and the other one of the two chambers, a non-condensable gas disposed in said other one of the two chambers above the liquid medium therein and in said passageways to provide a compressible cushion for the condensable vapors from the sealed casing, the liquid medium in the auxiliary casing being movable from said other one of the chambers to said one of the chambers as the pressure of the condensable vapors within the sealed casing increases above a predetermined value to thereby accommodate the non-condensable gas and permit the condensable vapors to enter said passageways, the cooling effect of the cooling surfaces of said passageways on the condensable vapors increasing as the condensable vapors fill said passageways and, the non-condensable gas, the auxiliary casing and said passageways cooperating with the flow of condensable vapor to provide for exposing only sufficient cooling surface to control the rate of condensation of the condensable vapors to maintain in the sealed casing a sufficiently high vapor pressure of the condensable vapors to effect an adequate dielectric strength of the condensable vapors.

References Cited in the file of this patent

UNITED STATES PATENTS

| | | |
|---|---|---|
| 854,276 | Darlington | May 21, 1907 |
| 2,711,882 | Narbutovskih | June 28, 1955 |